(12) United States Patent
Lemaire et al.

(10) Patent No.: US 8,955,509 B2
(45) Date of Patent: Feb. 17, 2015

(54) SOLAR WATER HEATING SYSTEMS AND METHODS OF MAKING AND USING THE SAME

(75) Inventors: Auguste Lemaire, Reno, NV (US); Nicholas Maus, Sparks, NV (US)

(73) Assignee: Sunvelope Solar, Inc., Reno, NV (US)

( * ) Notice: Subject to any disclaimer, the term of this patent is extended or adjusted under 35 U.S.C. 154(b) by 85 days.

(21) Appl. No.: 13/598,173

(22) Filed: Aug. 29, 2012

(65) Prior Publication Data

US 2013/0228167 A1 Sep. 5, 2013

Related U.S. Application Data

(60) Provisional application No. 61/528,645, filed on Aug. 29, 2011, provisional application No. 61/587,506, filed on Jan. 17, 2012.

(51) Int. Cl.
*F24J 2/20* (2006.01)
*F24J 2/46* (2006.01)

(52) U.S. Cl.
CPC ..... *F24J 2/202* (2013.01); *Y02E 10/44* (2013.01); *Y02B 10/20* (2013.01); *F24J 2002/4678* (2013.01)
USPC ......................................... 126/674; 29/157.3

(58) Field of Classification Search
CPC ........................................................ F24J 2/07
USPC ......................................... 126/674, 676, 675
See application file for complete search history.

(56) References Cited

U.S. PATENT DOCUMENTS

| | | | |
|---|---|---|---|
| 1,801,468 A * | 4/1931 | Van Dusen .................... | 220/692 |
| 3,611,534 A * | 10/1971 | Keith ........................ | 9/890.042 |
| 4,089,324 A * | 5/1978 | Tjaden ........................ | 126/666 |
| 4,091,797 A * | 5/1978 | George ........................ | 126/647 |
| 4,111,186 A | 9/1978 | Ross et al. | |
| 4,148,294 A * | 4/1979 | Scherber et al. .............. | 126/674 |
| 4,150,657 A * | 4/1979 | Bowen ........................ | 126/660 |
| 4,205,662 A * | 6/1980 | Rhodes et al. ............... | 126/672 |
| 4,217,885 A | 8/1980 | Bowles | |
| 4,243,020 A * | 1/1981 | Mier .......................... | 126/670 |
| 4,249,519 A * | 2/1981 | Martinez ...................... | 126/570 |
| 4,292,955 A * | 10/1981 | Smith ......................... | 126/666 |
| 4,292,956 A * | 10/1981 | Wasserman ................... | 126/651 |
| 4,331,503 A | 5/1982 | Benjamin | |

(Continued)

OTHER PUBLICATIONS

Korean Intellectual Property Office; Notification of Transmittal of the International Search Report and the Written Opinion of the International Searching Authority, or the Declaration; PCT/US2012/052888; 8 pp.

*Primary Examiner* — Steven B McAllister
*Assistant Examiner* — Rabeeul Zuberi
(74) *Attorney, Agent, or Firm* — Holland & Hart LLP

(57) ABSTRACT

Described herein are embodiments of solar heating systems, including solar collection panels used in the solar heating systems, and methods for manufacturing solar collection panels suitable for use in the solar collection panels. The solar heating system is a closed direct connected solar heating system that need not include heat exchangers or drain back systems. The solar collection panels include a series of interconnected pockets between two sheets of material and inlet and outlet fittings for providing fluid into and out of the solar collection panel. The system described herein is capable of operating under pressures of 160 psi or higher and can also tolerate extreme temperature conditions, such as freezing temperature conditions.

14 Claims, 14 Drawing Sheets

(56) References Cited

U.S. PATENT DOCUMENTS

| | | | |
|---|---|---|---|
| 4,351,470 A * | 9/1982 | Swadling et al. | 228/157 |
| 4,369,210 A * | 1/1983 | Sakamoto | 427/160 |
| 4,381,763 A * | 5/1983 | Kahl | 126/563 |
| 4,392,008 A * | 7/1983 | Cullis et al. | 136/248 |
| 4,423,718 A * | 1/1984 | Garrison | 126/655 |
| 4,455,999 A * | 6/1984 | Heckenbleikner | 126/591 |
| 4,459,975 A * | 7/1984 | Hobart | 126/702 |
| 4,474,172 A * | 10/1984 | Burke | 126/598 |
| 4,700,445 A * | 10/1987 | Raskin | 29/890.039 |
| 4,852,616 A * | 8/1989 | Holcomb | 138/173 |
| 5,143,053 A * | 9/1992 | Baer | 126/662 |
| 5,353,868 A * | 10/1994 | Abbott | 165/171 |
| 5,392,849 A * | 2/1995 | Matsunaga et al. | 165/167 |
| 6,251,067 B1 * | 6/2001 | Strickholm | 600/39 |
| 7,431,030 B2 * | 10/2008 | Nocera | 126/643 |
| 2004/0255932 A1 | 12/2004 | Nocera | |
| 2009/0151714 A1 | 6/2009 | Rhodes | |
| 2010/0101563 A1* | 4/2010 | Fischer | 126/651 |
| 2010/0132696 A1* | 6/2010 | Lemaire | 126/678 |
| 2010/0153312 A1* | 6/2010 | Lemaire | 705/500 |
| 2012/0160233 A1* | 6/2012 | Yuan et al. | 126/674 |
| 2014/0026885 A1* | 1/2014 | Aiso et al. | 126/652 |

* cited by examiner ized to specific reference to reference herein# SOLAR WATER HEATING SYSTEMS AND METHODS OF MAKING AND USING THE SAME This application claims priority to U.S. Provisional Application No. 61/528,645, filed Aug. 29, 2011, and U.S. Provisional Application No. 61/587,506, filed Jan. 17, 2012, each of which is hereby incorporated by reference in its entirety. U.S. Published Application Nos. 2010/0132696 and 2010/0153312, filed Dec. 3, 2008 and Dec. 3, 2009, respectively, are hereby incorporated by reference in their entirety.

BACKGROUND

Some traditional solar water heating systems use solar collection panels having a series of tubes arranged in parallel through which heat exchange fluid flows. As shown in FIG. 1, the tubes 1 of a solar collection panel 10 may be housed between plates 2, 3 and connected at their ends by manifolds 4, 5. The manifolds 4, 5 serve to distribute heat exchange fluid traveling to the collection panel 10 amongst the several tubes 1 at one end and to collect and carry away heat exchange fluid or water that has passed through the tubes 1 at an opposite end.

This type of solar collection panel typically has relatively poor heat transfer between the plate surface and the heat exchange fluid passing through the tubes. Normally, the tubes must be in contact with the plate surface in some way in order to effect heat transfer. However, because the tubes are typically either cylindrical or "D" shaped, the heat transfer surface between the plate surface and tubes is minimal and consequently a limited amount of heat transfer occurs between the plates and the fluid running through the tubes. To compensate for the limited heat transfer surface area, the solar collection panels can be made larger, but this not only increases the cost and weight of the system but also renders the solar collection panels more difficult to blend into their surroundings.

Other problems with previously known solar water heating systems such as those shown in FIG. 1 stem from the use of heat exchangers for transferring heat from the heat exchange fluid to the water stored in a water storage tank. FIG. 2 shows such a configuration, in which the traditional solar heating systems 20 employs a solar collection panel 21 in fluid communication with a coiled heat exchanger 22 disposed inside a water storage tank 23. One problem with this configuration is that the coiled heat exchanger 22 has a relatively small surface area for transferring heat to water passing around the coiled heat exchanger 22 in the water storage tank 23, reducing efficiency of the solar water heating system. The use of heat exchangers also adds complexity and cost to the system, as well as additional installation and maintenance issues.

These prior art systems also commonly utilize manifolds, such as those shown in the prior art solar collection panel of FIG. 1, for transferring fluid in and out of the solar collection panel. These manifolds are often the source of structural weakness in the solar collection panels. This can be due to the manner in which the manifolds are manufactured, which tends to include the shaping and bending of relatively thin sheets of metal. This can also be due to the silver brazing technique used to secure the manifold to the panel. The silver brazing anneals the manifold and creates structural weakness. Additionally, expansion of the manifolds as a result of heat transfer fluid freezing inside the manifolds can create further structural weaknesses. In some cases, even one freezing and thawing of heat transfer fluid inside the manifolds will ultimately result in the manifolds cracking and ruining the solar collection panel. The use of manifolds also makes it difficult to minimize the amount of space occupied on, for example, the roof of the building where the solar collection panels are installed. The manifolds extend beyond the solar collection panels and require the use of connectors, which means the solar collection panels cannot be arranged so that they abut one another. As a result, it becomes more difficult to blend the solar collection panels into the surrounding environment.

Due to some or all of the issues described above, the operating conditions for these traditional solar water heating systems are usually severely restricted and/or must be closely monitored. Often, substantial effort is undertaken to protect the solar collection panels from freezing conditions. In some cases, additional equipment is incorporated into the solar water heating system to safeguard against the freezing of heat exchange fluid in the solar collection panel. Such equipment (e.g., drain back systems and heat exchangers) can significantly increase the overall cost of the solar water heating system and result in additional maintenance issues.

Some other previously known solar water heating systems use envelope solar collection panels. U.S. Pat. No. 4,285,334 to Collins describes such a system. FIGS. 3 and 4 show a solar water heating system that uses an envelope collection panel 12 having a pair of steel plates 64, 66 seam welded together along the edges 68 and spot welded together at various points 70 to form flow passageways 72 between the plates.

Prior art solar collection panels having an envelope design usually have low tolerance for increased pressure levels. Since municipal water systems tend to operate at such increased pressure levels, prior art envelope solar collection panels usually require apparatus to reduce pressure in the line for water circulating through the envelope solar collection panels. Such equipment is costly and makes the system more complex. The need for additional equipment in such systems also makes installation and maintenance more difficult and expensive.

Envelope solar collection panels also typically require a heat exchanger in order to isolate the envelope solar collection panel from the high pressure inside the water system. As discussed above, heat exchangers increase the installed cost of the solar water heating systems and decrease the efficiency of the system.

Additionally, Collins indicates at, for example, column 4, lines 9-24, that the envelope solar collection panels described therein are not suited for use in extreme temperatures, and systems including envelope solar collection panels must include a drain back mechanism that allows for all fluid in the solar collection panel to be removed from the solar collection panel during freezing conditions.

BRIEF SUMMARY

In some embodiments, a closed direct-connected solar water heating system is described. The system can generally include a solar collection panel and a fluid containment vessel. The solar collection panel includes a first sheet of material spaced from an adjacent second sheet of material, with portions, such as the peripheral edges, of the first sheet of material secured to the second sheet of material and a series of interconnecting pockets formed throughout an interior volume between the first sheet of material and the second sheet of material. The solar collection panel can also include inlet and outlet fittings in fluid communication with the series of interconnecting pockets. The fluid containment vessel can include an inlet in fluid communication with the outlet fitting of the solar collection panel and an outlet in fluid communication with the inlet fitting of the solar collection panel.

In some embodiments, such a solar collection panel has the first sheet of material secured to the second sheet of material at a variety of points throughout the interior volume formed by the first and second sheet of material. In some embodiments, the distance between points is from 0.1 inches to 3.0 inches, and the height of the pockets is from 0.01 inches to 0.50 inches.

In some embodiments, such a solar collection panel has the first sheet of material secured to the second sheet of material with a variety of line welds formed in the interior portion of the first sheet of material. In some embodiments, the distance between line welds is from 0.1 inches to 3.0 inches, and the height of the channels is from 0.01 inches to 0.50 inches.

In some embodiments, a solar collection panel manufactured by a specific method includes positioning a first sheet of material on a second sheet of material. The first sheet of material is positioned adjacent the second sheet of material and the first sheet of material is secured to the second sheet of material at a variety of points throughout the interior volume formed by the first and second sheet of material. Portions, for example the edges, of the first sheet of material are secured to the second sheet of material, which thereby forms an enclosed volume between the first sheet of material and the second sheet of material. Pressure is applied to the enclosed space to separate the first sheet of material from the second sheet of material at the locations between the points. This can form a series of interconnected pockets through which fluid can flow within the solar collection panel.

In some embodiments, a solar collection panel comprises an enclosed fluid flow chamber, a fluid inlet fitting in fluid communication with the enclosed fluid flow chamber, and a fluid outlet fitting in fluid communication with the enclosed fluid flow chamber. The fluid flow chamber includes a plurality of fluidly interconnected ellipsoid-shaped pockets.

In certain instances, the plurality of pockets have a fairly uniform maximum height, such as within a range of from 0.01 inches and 0.50 inches. The fluid inlet fitting is located at a first edge of the solar collection panel, and the fluid outlet fitting is located at a second edge of the solar collection panel that is opposite the first edge.

Numerous advantages can be variously achieved by certain of the embodiments summarized above. For example, the solar heating system can provide a closed direct connected system and therefore need not necessarily, in all instances, include the use of a heat exchanger, a drain back system, or other supplemental equipment that tends to complicate and increase the cost of solar heating systems. Elimination of this supplemental equipment can also reduce the cost of installing such systems and make installation easier and faster. In some instances, the disclosed system can utilize pre-existing hot water heating equipment, which further reduces costs and complexity.

Certain embodiments of the disclosed solar collection panel can operate at elevated pressures, such as those provided commonly by municipal water delivery systems. In some embodiments, solar collection panels can handle pressures of 160 psi and higher without damaging various components of the solar collection panel.

In some embodiments, increased fluid pressure can be accompanied at least in part to the use of certain fittings instead of prior art types of manifolds. The fittings can be substantially stronger than such manifolds and do not create points of weakness in the solar collection panel in the same manner as manifolds tend to.

In some embodiments, solar collection panels are also capable of tolerating higher pressure due to the manner in which the solar collection panels are manufactured. Pressure is applied to the enclosed area between the two sheets of materials to form the series of interconnected pockets. In some embodiments, the pressure applied is 160 psi or more. Because the solar collection panels are exposed to this degree of pressure as part of the manufacturing process, the solar collection panels become capable of handling equal or greater pressure levels when in operation.

In some embodiments, increased pressure tolerance in the solar collection panel can also be provided by relatively uniform spot weld spacing, which can provide appropriate flexion during use of the panel while also providing sufficient strength.

In those embodiments in which the solar collection panels are capable of operating at elevated pressures, the solar panels can be connected directly to typical higher pressure municipal water systems or otherwise utilize water under such pressure without need for pressure reduction apparatus. This can make the system easier to use and allow for solar heating systems that do not require heat exchangers (which tend to be included in previously known systems, so that solar collection panels are isolated from elevated pressures).

Some embodiments of solar panel systems are capable of operating in extreme temperature conditions, including in freezing temperature conditions commonly experienced in North America for example. As a result, in some embodiments fluid within the solar collection panels can freeze and thaw multiple times without causing damage to the solar collection panels. In certain instances, the unique structure of the solar collection panels, such as for example the spacing of the spot welds and the height of the interconnecting pockets, can allow the pockets to expand and contract in response to freezing and thawing with substantially reduced permanent deformation and/or the creation of weak spots in the solar collection panel.

In some embodiments, the solar collection panels can be up to one third smaller than traditional solar collection panels. In some embodiments, this can reduce manufacturing, shipping, and maintenance cost as well as reduce installation weight. In some embodiments, this can also allow for the solar collection panels to more easily blend in with surroundings. It can also, depending on the embodiment involved, allow for installation of solar collection panels between joists of a roof, for example, to integrate the solar collection panels into the roof.

As further examples, certain embodiments of the solar collection panels can be mounted flush against adjoining solar collection panels due to the use of fittings instead of manifolds. Additionally, certain embodiments can be painted any of a number of colors to further help the solar collection panels blend in with surroundings.

Some embodiments can be scaled down for use with small systems. For example, some embodiments can be used on recreational vehicles, house boats, and the like. For example, some embodiments can be particularly well suited for use with RVs and the other vehicles because they can be smaller in size while also being more tolerant of freezing and thawing, and being capable of being connected to a municipal water system provided at, e.g., an RV park. Further, the solar heating system can be generally less complex and require less equipment than traditional solar heating systems.

Features from any of the above mentioned embodiments may be used in combination with one another, without limitation.

It should be understood that the foregoing describes certain advantageous aspects of the present specification. There are, however, other advantageous aspects, and they will become apparent as this specification proceeds. In this regard, this Summary and the Background are not limiting, and thus the scope of the invention is to be determined by the scope of the claims as issued and not by whether a given feature is recited in this Summary or addresses any issue or consideration recited in the Background.

BRIEF DESCRIPTION OF THE DRAWINGS

Non-limiting and non-exhaustive embodiments, including the preferred embodiments, are described with reference to the following figures.

Figure 1:
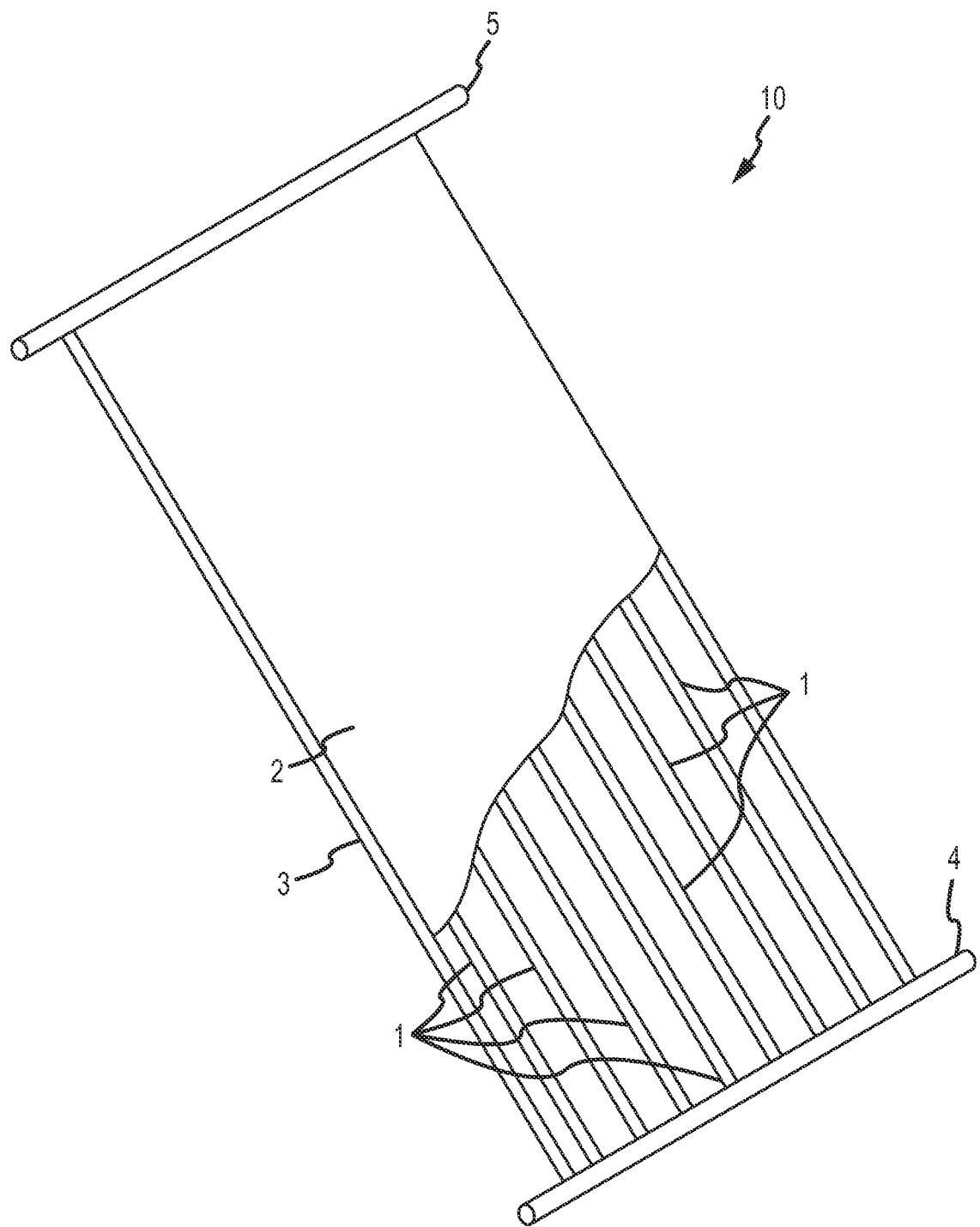
FIG. 1 illustrates a perspective view of a solar collection panel as known in the art.
Figure 2:
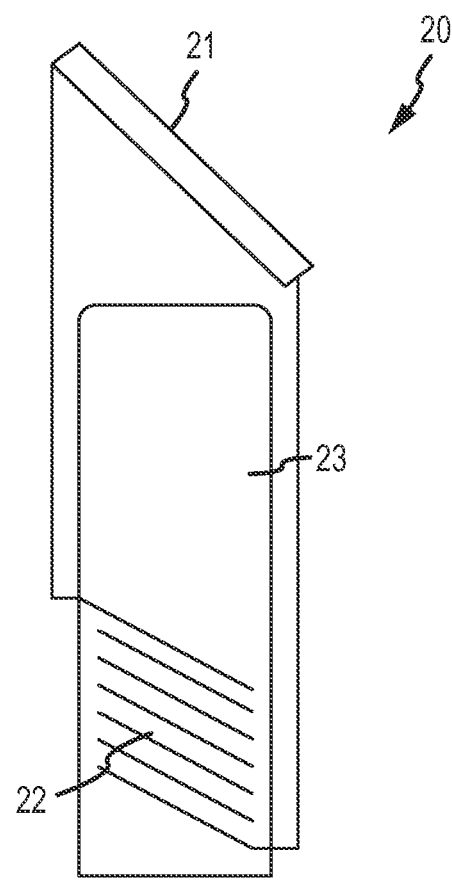
FIG. 2 illustrates a solar water heating system utilizing a heat exchanger as known in the art.
Figure 3:
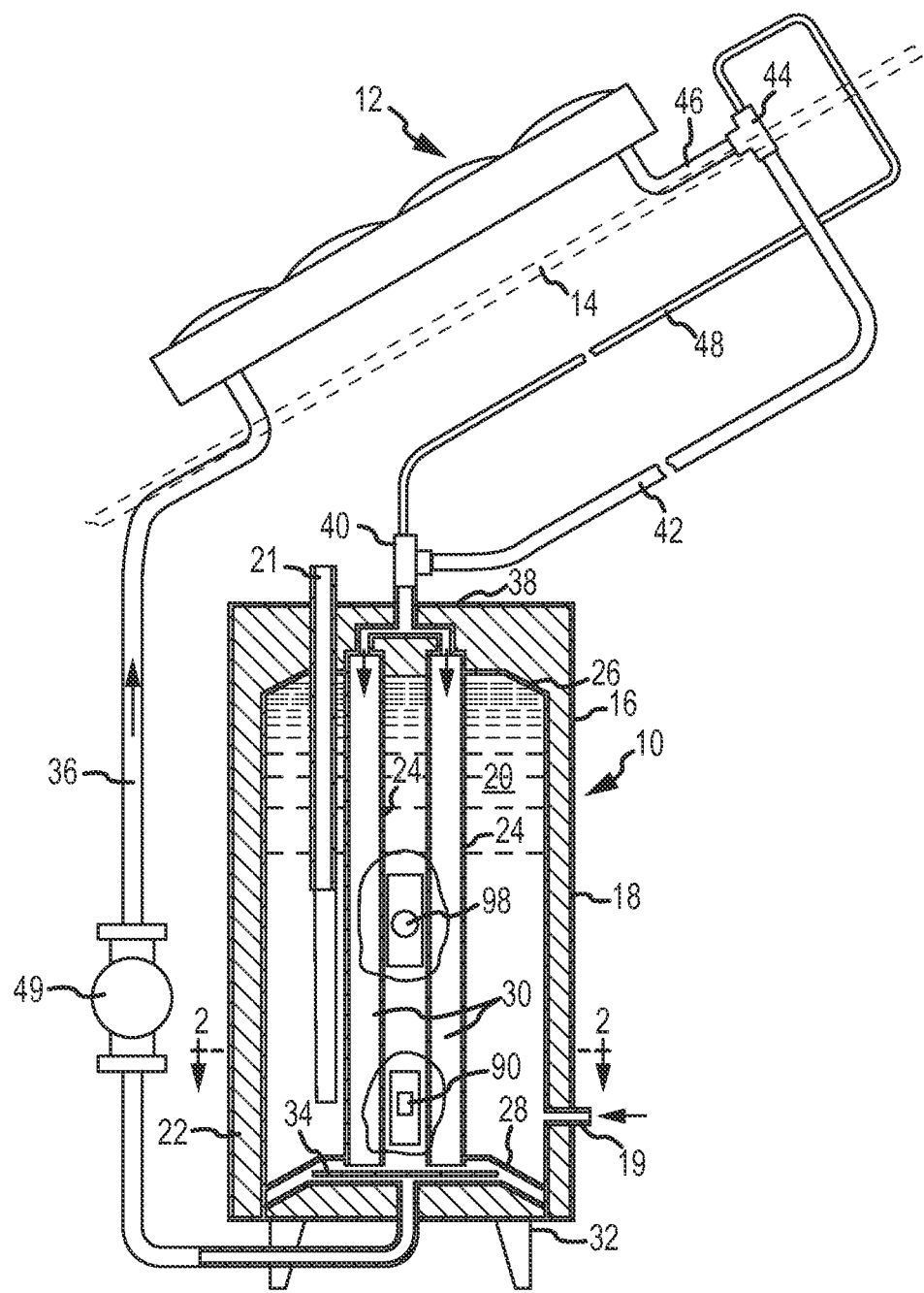
FIG. 3 illustrates a cross-sectional view of a solar water heating system as known in the art.
Figure 4:
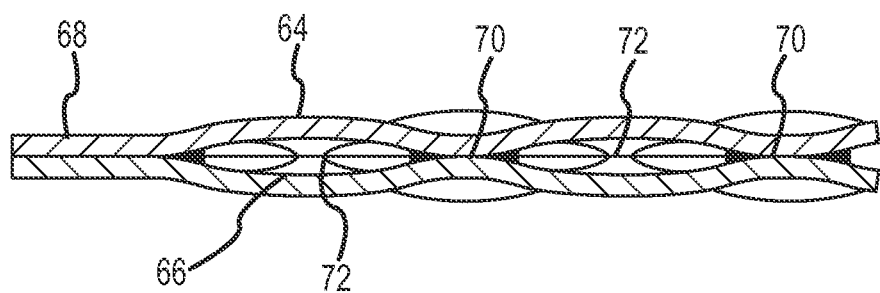
FIG. 4 illustrates a cross-sectional view of a solar collection panel known in the art.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Figure 5:
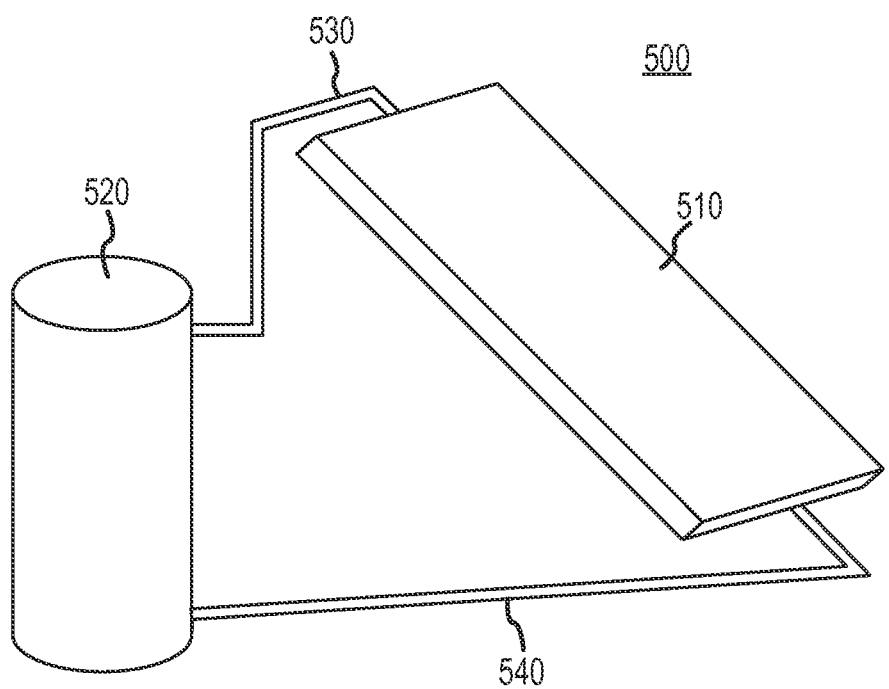
FIG. 5 illustrates a perspective view of a solar water heating system according to embodiments described herein.

With reference to FIG. 5, a closed direct connected solar water heating system 500 according to some embodiments described herein includes a solar collection panel 510 and a fluid-containment vessel 520. The solar water heating system 500 can also include a first set of piping 530, and a second set of piping 540. The first set of piping 530 and the second set of piping 540 provide fluid communication between the solar collection panel 510 and the interior of the fluid containment vessel 520 to create a closed fluid loop allowing fluid to travel throughout solar heating system 500 and associated plumbing.

The solar water heating system 500 illustrated is also a closed direct-connected solar water heating system. Closed direct-connected solar water heating systems are those systems where the solar collection panel is connected directly to the fluid containment vessel, do not include heat exchangers, and are not open to the atmosphere. Rather, the fluid travelling through the solar collection panel 510 and being heated by solar energy is the same fluid stored in the fluid containment vessel 520 and delivered, typically by plumbing, for use directly by consumers. Thus, the fluid is completely contained within the system 500 except as removed from the system 500 through fluid containment vessel 520.

In some embodiments, the fluid travelling through the system 500 is water. Water is heated in the solar collection panel 510, travels into and is stored in the interior of the fluid containment vessel 520, and can then be removed from the fluid containment vessel 520, such as through plumbing to an associated home or building, for use in, e.g., washing dishes, washing clothes, cooking, showering, etc. Such a closed system can utilize the water within the system and also provide uncontaminated, potable water from the water supply into, for example, an associated home or building.

In operation and referring now to FIG. 5 systems generally, fluid passing through solar collection panel 510 is heated by solar energy hitting the solar collection panel 510 and heating the fluid therein. The heated fluid leaving solar collection panel 510 travels via the first set of piping 530 into the interior of the fluid containment vessel 520. The heated water can then be drawn out of the fluid containment vessel 520 for use (such as through a separate outlet not shown in FIG. 5). Fluid to be heated or reheated can exit the fluid containment vessel 520 and travel through the second set of piping 540 back to the solar collection panel 510 for heating via solar energy. Elimination of a heat exchanger for passing heat from the fluid that has passed through the solar collection panel 510 to fluid inside of the fluid containment vessel 520 improves the overall efficiency of the system 500.

The solar collection panel 510 can be any suitable solar collection panel capable of collecting solar energy and transferring heat to a fluid running therethrough. In some embodiments, the solar collection panel 510 is of a type capable of operating under elevated pressures (e.g., 160 psi and above) and in extreme temperature conditions. Such solar collection panels capable of operating under elevated pressures are beneficial for several reasons, including the ability to connect the solar water heating system 500 directly to a municipal water system and the ability to eliminate heat exchangers used in part to isolate the solar collection panel 510 from the elevated pressure. Solar collection panels capable of operating under extreme temperatures are beneficial for several reasons, including expanding the geographic regions in which the solar collection panels can be used in direct systems and reducing the cost and complexity of the solar water heating system 500 by eliminating equipment (such as drain back or glycol systems).

Figure 6:
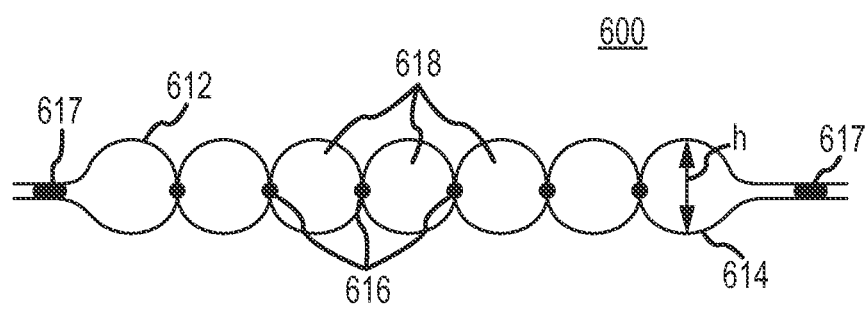
FIG. 6 illustrates a cross-sectional view of a solar collection panel taken along a line intersecting several spot welds according to embodiments described herein.

With reference to FIG. 6, a solar collection panel 600 suitable for use in the system 500 is capable of operating under elevated pressures and extreme temperature conditions. The solar collection panel 600 is an envelope-type of solar collection panel. The solar collection panel 600 generally includes a first sheet of material 612 adjacent a second sheet of material 614. The first sheet of material 612 and the second sheet of material 614 can have approximately the same shape and size so that the first sheet of material 612 can be positioned over the second sheet of material 614 so that the edges of the two sheets of material align adjacent each other.

The first sheet of material 612 is spot welded 616 to the second sheet of material 614 at multiple locations throughout the interior portion of the first sheet of material 612. Additionally, the peripheral edges of the first sheet of material 612 and the second sheet of material 614 are secured to one another (such as by seam welding 617). Once the peripheral edges of the first sheet of material 612 and the second sheet of material 614 are secured to one another, an enclosed area is formed between the first sheet of material 612 and the second sheet of material 614. A sufficient amount of pressure is applied in to this enclosed area so that the first sheet of material 612 and the second sheet of material 614 move away from each other in the areas between the seam welds 616. This ultimately forms a series of interconnected pockets 618 through which fluid can travel throughout the interior area of the solar collection panel 600.

Each pocket 618 can generally include three or more spot welds that define an outer perimeter of the pocket. The first sheet of material and the second sheet of material bounded by the three or more spot welds form the upper and lower portion, respectively, of each pocket. The first sheet of material and the second sheet of material are joined together at each spot weld and diverge from each other until a maximum point of divergence (i.e., a pocket peak) is reached proximate the center of the area bounded by the spot welds. The maximum point of divergence is labeled as "h" in FIG. 6.

In some embodiments, the maximum point of divergence h is within a range of from 0.01 inches to 0.50 inches. In some embodiments, the maximum point of divergence h for each pocket in a solar collection panel is roughly uniform, such as within +/−0.01 inches of each other.

The maximum point of divergence h can be established during the manufacturing process based on the pressure applied into the enclosed area between the first sheet of material 612 and the second sheet of material 614. Generally speaking, the higher the pressure used to open the pockets, the greater the maximum point of divergence h for each pocket. In some embodiments, the pressure applied into the enclosed area is in the range of from 1 psi to 300 psi, and more preferably, from 100 psi to 200 psi.

The shape of the internal volume of the pockets formed is generally not limited. In some embodiments, the shape of the pockets is impacted by the spacing of the spot welds and/or the maximum point of divergence. In some embodiments, the pockets have a generally spherical or ellipsoid shape.

More fluid can be present in a solar collection panel having a greater height h, which in turn means that more expansion and possible permanent deformation of the pockets will occur if the fluid freezes. As a result, the maximum point of divergence and the pressure used to open the pockets should be kept within the ranges provided above in order to provide solar collection panels that do not permanently deform when frozen and which can therefore withstand multiple freezing and thawing cycles.

The slope of the first sheet of material and the second sheet of material generally decreases from each spot weld towards the maximum point of divergence so that the first sheet of material and the second sheet of material each have a generally concave shape. The volume between the two generally concave sections form the pockets of the solar collection panel.

The spot welds used to establish the perimeter of the pockets can be arranged on the first sheet of material and the second sheet of material in any pattern, including both uniform and irregular patterns. In some embodiments, the distance between spot welds 616 is from 0.1 inches to 3.0 inches, and more preferably, from 0.5 inches to 1.5 inches. In some embodiments, the distance between spot welds is roughly uniform, such as within +/−0.1 inches.

In some embodiments, the pattern of spot welds creates rows and columns of spot welds that are either parallel or perpendicular to the edges of the first sheet of material and the second sheet of material. In these embodiments, the perimeter of each pocket is defined by four spot welds arranged in a square pattern. The maximum point of divergence can be proximate the center of the square defined by the spot welds.

Spacing the spot welds within this range helps to provide the solar collection panel with an appropriate amount of flexion. Within this range, the spot welds are far enough apart so as to allow the pockets to expand when, for example, water freezes inside the solar collection panel, while also not being spaced so far apart as to allow for excessive flexing. Excessive flexing can lead to permanent deformation and/or the formation of areas of weakness within the solar collection panel, both of which can lead to decreased efficiency and/or total failure.

The first sheet of material 612 and the second sheet of material 614 can generally include any material known to those of ordinary skill in the art to be suitable for use in a solar collection panel. In some embodiments, the first and second sheets of material 612, 614 are steel, stainless steel, aluminum, or copper. Stainless steel can be used effectively in applications that utilize water as the fluid, particularly water that may be used to deliver potable water.

As used herein, the term stainless steel refers to any steel alloy having a minimum 10.5% chromium content by mass. The stainless steel can be of any grade, surface finish, and crystalline structure. Elements such as nickel and manganese can also be included in the stainless steel. The thickness of the sheets can range from between 0.0062 inches and 0.031 inches, and more preferably, from between 0.013 and 0.025 inches. In some embodiments, the sheets of material range from 38 gauge stainless steel and 22 gauge stainless steel, and more preferably, from 28 gauge stainless steel to 26 gauge stainless steel.

In some embodiments, the thickness of the material used impacts the distance between spot welds needed to ensure that the solar collection panel will operate at elevated pressures and temperatures and will be capable of withstanding multiple freeze/thaw cycles. In embodiments where the solar collection panel is to be used at pressures up to 160 psi, the spot welds should be spaced according to the following equation:

$$S = T/0.02 \tag{1}$$

where T is the thickness of the sheets of material and S is the distance between spot welds. Accordingly, in one example where the sheets of material have a thickness of 0.02 inches, the spot welds should be space apart 1 inch in order to provide a solar collection panel capable of operating at pressures in the range of 160 psi.

Equation (1) above includes the constant 0.02 which is specific to providing a solar collection panel suitable for use in pressures up to 160 psi. The constant can be adjusted up or down for different operating conditions. For example, the constant may be lower when the solar collection panel is to be operated at lower pressures and the constant may be higher when the solar collection panel is to be operated at higher pressures.

The relationship between the sheet material thickness T and the distance between spot welds S according to Equation (1) above unexpectedly provides benefits related to the ability of the solar collection panels to operate at elevated pressure and at extreme temperatures. The applicant believes that this relationship has not previously been identified in the prior art as impacting the ability of a solar heating system to operate at pressures of 160 psi and higher or to allow for multiple freezing and thawing cycles without damaging the system. Whereas previous systems have set pressure limits of, for example, 10 psi or lower and have strictly prohibited freezing conditions, the relationship described in Equation (1) has been found to dramatically increase the system's tolerance to these conditions. This illustrates the magnitude of difference between embodiments described herein and previously known solar heating systems, which have been nowhere near capable of tolerating such elevated pressure and extreme temperatures. In fact, many previously known solar water heating systems specifically warn against use of the systems under such extreme conditions. For example, many previously known solar water heating systems cannot be connected to a municipal water system because the solar collection panels of the systems cannot tolerate the water pressure in such municipal water systems. To the contrary, some embodiments of the solar collection panel described herein can tolerate pressures of 160 psi or higher, and can therefore be connected to municipal water systems.

The pressure used to open the pockets and establish the maximum pressure at which the solar collection panel 600 can be operated without permanent change of pocket dimension can vary. For example, the Solar Rating and Certification Corporation requires all solar collection panels that are to connected directly to city water pressure undergo a pressure test of 160 psi. Thus, the pressure used to open the pockets can be 160 psi or higher to ensure compliance with this standard.

The shape of first sheet of material 612 and second sheet of material 614 is generally not limited, which allows for custom solar collection panels to be manufactured that are better suited for blending into surrounding environment. The first sheet of material 612 and the second sheet of material 614 can be rectangular, but can also have a circular shape, a triangular shape, or a polygon having any number of sides. The shape of first sheet of material 612 and second sheet of material 614 may also have a regular polygon shape or an irregular polygon shape.

As noted above, the peripheral edges of the first sheet of material 612 and the second sheet of material 614 are secured to one another to form an enclosed area between the two sheets of material. The peripheral edges can be secured to one another by any suitable technique. In some embodiments, the edges are seam welded together. The seam welding can include the use of resistance welding. The spot welding used to spot weld the first sheet of material 612 to the second sheet of material 614 can be any type of spot welding technique known to those of ordinary skill in the art, and can include resistance welding. This manufacturing technique can be applied to opposed sheets quickly and economically, and the welds can last for a very long time in use in the field.

Figure 7:
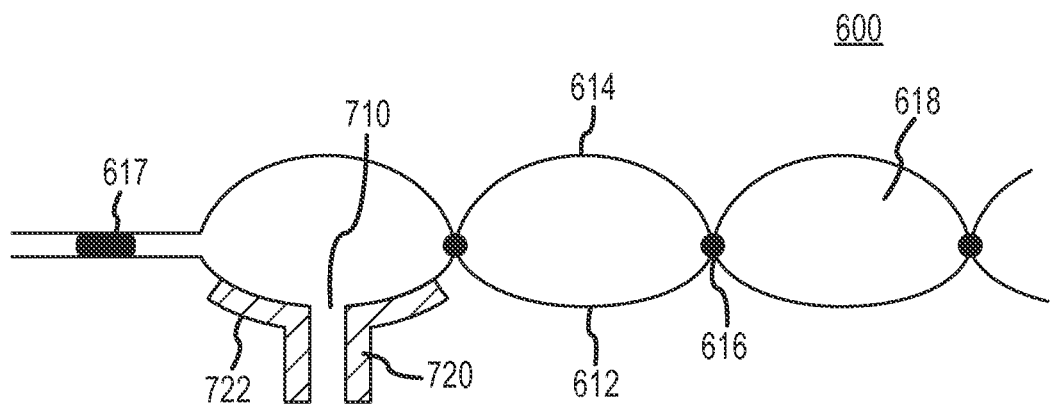
FIG. 7 illustrates a cross-sectional view of one embodiment for positioning fittings on the solar collection panel described herein.
Figure 8:
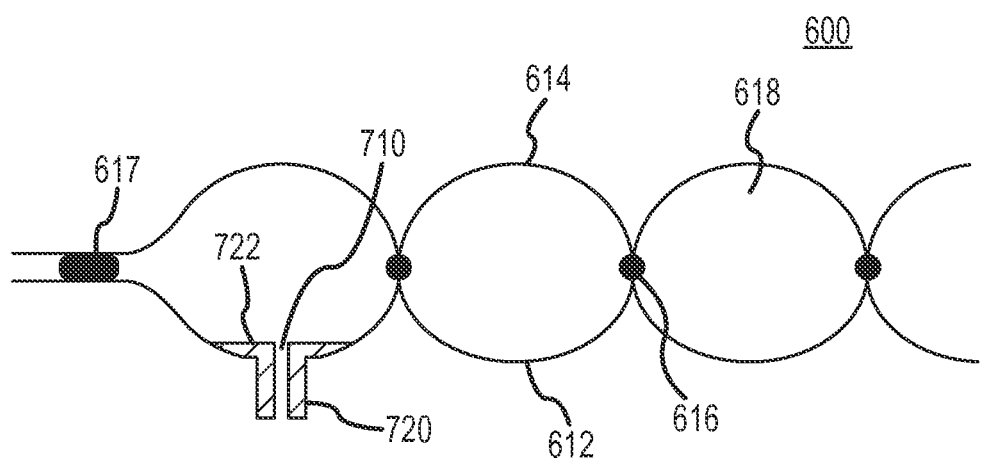
FIG. 8 illustrates a cross-sectional view of another embodiment for positioning fittings on the solar collection panel described herein.

With reference now to FIGS. 7 and 8, inlet passages, outlet passages, and fittings can be applied to the first or second sheet of material in order to provide a path for fluid to move in and out of the solar collection panel and to provide connections for the first set of piping and second set of piping that fluidly connects the solar collection panel to the fluid containment vessel. In some embodiments, inlet and outlet passages are formed in the first and/or second sheet of materials. As shown in FIGS. 7 and 8, the inlet passage 710 is formed in the first sheet of material 612. As also shown in FIGS. 7 and 8, the inlet passage 710 is formed proximate the peripheral edges of the solar collection panel 600. The inlet passage 710 should be of such size as to be compatible with whatever fittings are used and to allow adequate flow of fluid through the solar collection panel 600. A fitting 720 is then secured to the first sheet of material 612 at the position of the inlet passage 710 to ensure that any fluid traveling through the fitting 720 enters the enclosed area of the solar collection panel 600. Any method capable of securing the fitting 720 to the first sheet of material 612 and providing a fluid tight seal between the fitting 720 and the first sheet of material 612 can be used. FIG. 7 illustrates one manner for securing the fitting 720 to the first sheet of material 612, wherein the flange 722 of the fitting 720 is flush against exterior surface of the first sheet of material 612. The fitting 720 can be secured to the first sheet of material 612 using an adhesive between the flange 722 of the fitting 720 and the first sheet of material 612. In preferred embodiments, brazing techniques, such as copper or silver brazing, are used to join the metal fitting 720 to the metal first sheet of material 612.

FIG. 8 illustrates an alternative, and in some cases preferred, method for securing the fitting 720 to the first sheet of material 612. In this method, the fitting 720 is secured to the first sheet of material 612 prior to the first sheet of material 612 being spot welded or seam welded to the second sheet of material 614. The fitting 720 is secured to the first sheet of material 612 using an inlet passage 710 having a countersink. The cylindrical portion of the fitting 720 is threaded through the inlet passage 710 from the interior surface of the first sheet of material 612, such that the flange 722 is received in the countersink. The flange 722 is then secured to the first sheet of material 612 using a brazing technique. In this manner, the flange 722 becomes flush with the interior surface of the first sheet of material 612 and will not impede the flow of the fluid through the enclosed portion of the solar collection panel 600. This type of attachment also provides additional strength at the location of attachment and reduces the chance that the attachment location will be a point of structural weakness in the solar collection panel 600 where increased pressure could lead to blow out.

As shown in FIGS. 7 and 8, the fittings 720 can have a "top hat" shape where the main cylindrical portion of the fitting 720 is straight and oriented perpendicular to the first sheet of material 612. Other fitting shapes can also be used, such as fittings that are oriented at an angle (such as 45°), or fittings that have an elbow and bend 90° such that the terminal end of the fitting is parallel to the first sheet of material.

While FIGS. 7 and 8 do not illustrate the outlet passage or the fitting positioned at the outlet passage, the outlet passage and associated fitting can be similar or identical to the inlet passage and associated fitting described above.

While embodiments of the solar collection panel described herein can include fittings as illustrated in FIGS. 7 and 8, manifolds can be used in other embodiments of the solar collection panel.

In some embodiments, the inlet and outlet passages (and their associated fittings) are positioned proximate the peripheral edges of the solar collection panels. In some embodiments, the inlet passage is located proximate a first peripheral edge and the outlet passage is positioned proximate a second peripheral edge that is at an end opposite the end on the solar collection panel from the first peripheral edge. In this manner, fluid can enter the solar panel collector at one end, flow through the length of the solar collection panel, and exit the solar panel collector at an opposite end. In some embodiments where the solar collection panel has a rectangular shape, the inlet passage is located proximate a first corner and the outlet passage is located proximate the corner that is diagonal from the first corner. When the solar collection panel is positioned at an incline, the inlet passage can be located at a lower end of solar collection panel and the outlet passage can be positioned at the higher end of solar collection panel.

A primary benefit of using the fittings in place of manifolds that have previously been used with solar collection panels is that the fittings allow for higher pressures to be used inside the solar collection panel without concerns for blowout. When manifolds are used, the manifolds serve as weak points in the solar collection panel that will split upon the application of increased pressure (e.g., higher than 30 psi). However, solar collection panels using fittings according to embodiments described herein can operate at internal pressures of 100 psi or more without concern for the ability of fittings to withstand such pressures.

Figure 9:
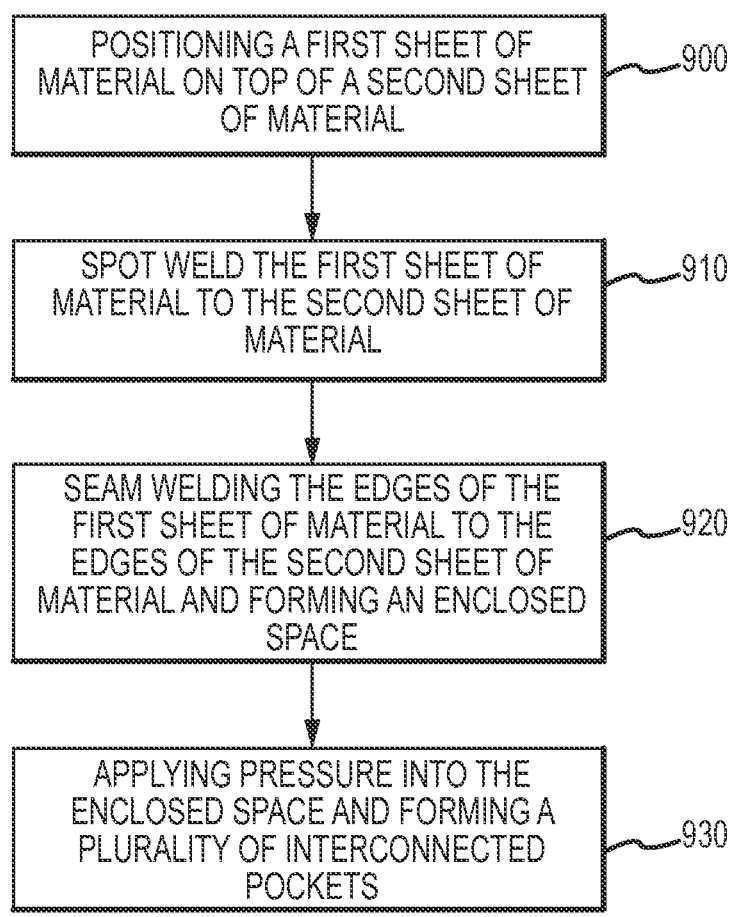
FIG. 9 is a flow chart outlining a method of manufacturing a solar collection panel according to embodiments described herein.

With reference to FIG. 9, a method for manufacturing the solar collection panel described above includes a step 900 of positioning a first sheet of material on top of a second sheet of material having approximately the same size and shape as the first sheet of material, a step 910 of spot welding the first sheet of material to the second sheet of material in a uniform pattern throughout the interior area of the first sheet of material, a step 920 of seam welding the edges of the first sheet of material to the edges of the second sheet of material, and a step 930 of applying pressure to the enclosed space formed between the first sheet of material and the second sheet of material. The application of pressure in step 930 results in the formation of a series of interconnected pockets between the two sheets of material through which fluid can flow.

In step 900, a first sheet of material and a second sheet of material are provided and positioned on top of one another. The first and second sheet of material can be similar or identical to the first and second sheet of material described above in greater detail. In some embodiments, the two sheets of material are stainless steel and have a similar size and shape so that when the first sheet is positioned on top of the second sheet, the edges of the two sheets align with one another.

In step 910, the first sheet of material is sport welded to the second sheet of material in multiple locations. In some embodiments, the first sheet of material is clamped together with the second sheet of material prior to performing the spot welding. The spot welding may be performed by hand or by automated machinery. In some embodiments, a sequential spot welder can be used to perform multiple spot welds at once. The sequential spot welder can also help to create a uniform pattern of spot welds. The timing and voltage used for each spot weld may vary depending on factors such as the thickness and material of the first and second sheets of material. In some embodiments, the spot welding is resistance spot welding.

The number and arrangement of spot welds is generally not limited. In some preferred embodiments, the spot welds are formed in uniform pattern throughout the interior area of the first sheet of material. Because the edges of the sheets of material will be secured via a subsequent seam welding step, it is preferable that the pattern of spot welds does not extend all the way to the edges of the first sheet of material. In some embodiments, each spot weld is a uniform distance away from adjacent spot welds, and the range of uniform distance between spot welds is from 0.1 inches to 3.0 inches.

Figure 10:
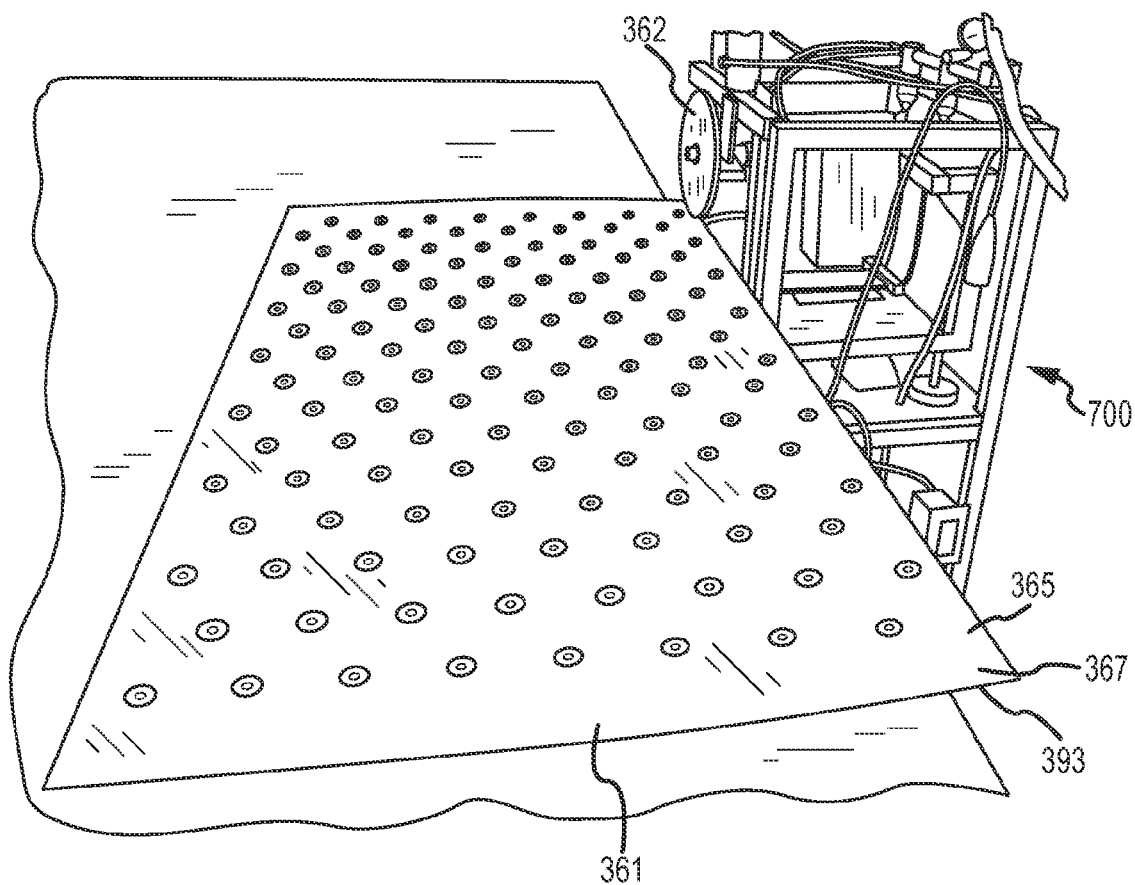
FIG. 10 illustrates a perspective view of a seam welder suitable for use in manufacturing a solar collection panel according to embodiments described herein.
Figure 11A:
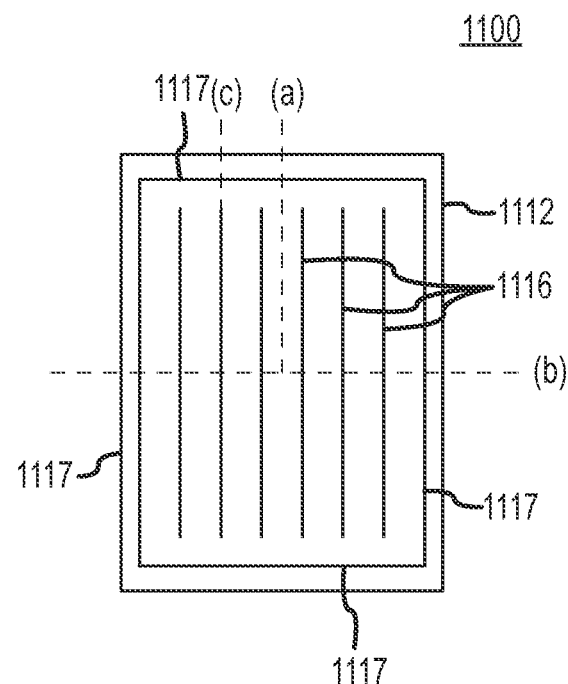
FIG. 11A illustrates a top view of a solar collection panel according to embodiments described herein.
Figure 11B:
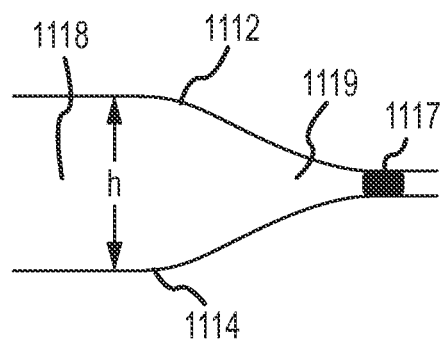
FIGS. 11B, 11C, and 11D illustrate cross sectional views of the solar collection panel illustrated in FIG. 11A taken along lines (a), (b), and (c), respectively.
Figure 11C:
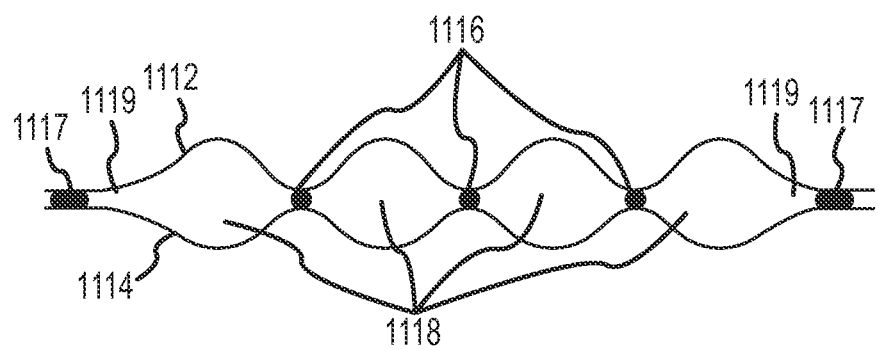
Figure 11D:
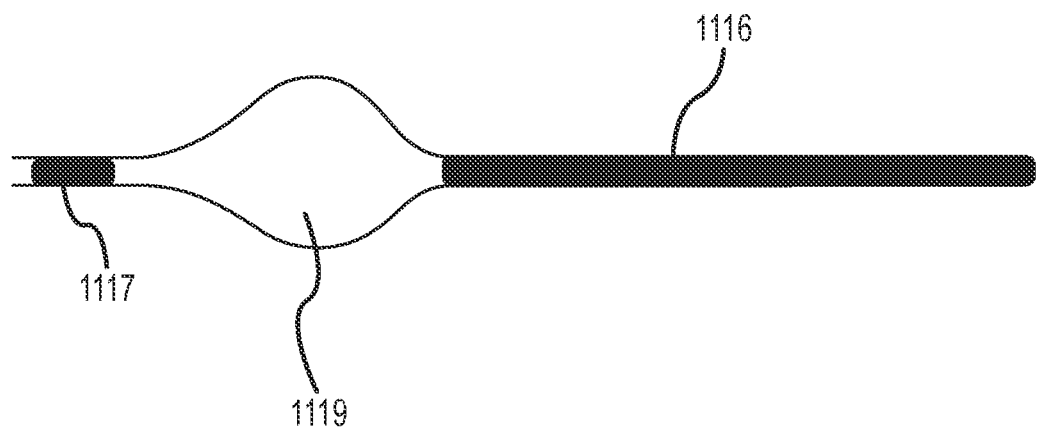

In step 920, the edges of the first sheet of material are seam welded to the edges of the second sheet of material. An aim of the seam welding is to form an enclosed area between the first sheet of material and the second sheet of material. The seam welding of the edges can be performed simultaneously or sequentially, and can be performed by hand or by an automated machine. As shown in FIG. 10, the seam welding may be performed by passing the edges between two rollers 362. The pressure exerted by these two rollers 362 may be controlled by pneumatic pressure and the rollers 362 may be moved along the length of the first and second sheets of material by an electric gear motor or motors. The speed of the wheels and voltage supplied to the wheels may be adjusted to create an optimum seam weld. The seam weld may be a resistance seam weld. The seam weld is preferably created along the entire length of the first and second sheets of material 361. In some embodiments, the seam weld is created at a distance 0.5 inches from the edge of the two sheets.

Once the two sheets are attached together and an air tight bond is created around the perimeter, a step 930 of applying pressure in to the enclosed area between the two sheets can be performed. Applying pressure in to the enclosed area causes the first sheet to separate from the second sheet in the areas between spot welds. This ultimately creates a series of interconnected pockets through which the fluid can flow through.

Pressure can be applied into the enclosed are using any suitable material. In some embodiments, a gas or liquid is used to apply pressure into the enclosed area. The amount of pressure applied can generally range from 1 psi to 300 psi. The amount of pressure applied into the enclosed area will impact the height of the pockets formed. In some embodiments, the amount of pressure applied into the enclosed area is such that the uniform height of the pockets ranges from 0.01 inches to 0.50 inches.

The manner in which pressure is applied into the enclosed area is not limited. In some embodiments, the pressure is applied through a fitting and hole formed in the sheet of material prior to spot welding and seam welding the two sheets of material. As described in greater detail above, a hole is cut in the first sheet of material and a fitting is secured to the first sheet material at the location of the hole. If two sets of holes and fittings are formed in the first sheet of material (e.g., an inlet fitting and an outlet fitting), one of the fittings can be plugged or capped prior to applying pressure into the enclosed area, or pressure can be applied through both fittings. The perimeter of the two sheets of material can be clamped in suitably sized frames in order to hold and support the two sheets of material during the application of pressure.

After application of pressure and formation of the series of interconnecting pockets, tests can be performed on the solar collection panel to determine if the solar collection panel is appropriately sealed. The solar collection panel can be tested under water while under pressure to determine if any leaks exist. Additional welding can be carried out in leak locations to seal the solar collection panel.

At any point during or after the above described method, the color of the first sheet of material and second sheet of material may be changed. Changing the color of the first sheet of material and the second sheet of material may be achieved by any suitable means, such as painting or dyeing. Any type of paint may be used to change the color of the first and second sheets of material, including commercially available paints, such as Glidden™, Behr™ or Benjamin Moore™. The color may be changed to any color, including red, orange, yellow, green, blue, indigo and violet or any shade thereof. In one aspect, the color is a dark shade of one of the previously mentioned colors.

With reference to FIGS. 11A, 11B, 11C, and 11D, embodiments of another solar collection panel suitable for use in the system 500 and which is capable of operating under elevated pressures and extreme temperature conditions includes one or more channels instead of pockets. The solar collection panel 1100 is an envelope-type of solar collection panel. The solar collection panel 1100 generally includes a first sheet of material 1112 adjacent a second sheet of material 1114. The first sheet of material 1112 and the second sheet of material 1114 can have approximately the same shape and size so that the first sheet of material 1112 can be positioned over the second sheet of material 1114 so that the peripheral edges of the two sheets of material align adjacent each other.

The first sheet of material 1112 is line welded to the second sheet of material 1114 one or more times to form one or more line welds 1116 in the interior portion of the first sheet of material 1112. Additionally, the peripheral edges of the first sheet of material 1112 and the second sheet of material 1114 are secured to one another (such as by seam welding 1117). In some embodiments, the one or more line welds 1116 do not extend to the seam welding 1117 at the peripheral edges. Once the peripheral edges of the first sheet of material 1112 and the second sheet of material 1114 are secured to one another, an enclosed area is formed between the first sheet of material 1112 and the second sheet of material 1114. A sufficient amount of pressure is applied in to this enclosed area so that the first sheet of material 1112 and the second sheet of material 1114 move away from each other in the areas between the line welds 1116. This ultimately forms a series of channels 1118 through which fluid can travel throughout the interior area of the solar collection panel 1100.

The line welds 1116 can generally extend from proximate one end of the first sheet of material 1112 to proximate an opposite end of the first sheet of material 1112. The line welds 1116 can be generally parallel to the sides of the first sheet of material 1112 and perpendicular to the ends of the first sheet of material 1112. In some embodiments, the line welds 1116 do not extend all the way to the seam welds 1117 used to secure the peripheral edges of the first sheet of material 1112 to the second sheet of material 1114 at the peripheral edges. In this manner, distribution channels 1119 are formed at the first and second end of the solar collection panel 1100. These distribution channels 1119 allow fluid to be passed into the solar collection panel 1100 at an end of the solar collection panel 1100 and access each channel 1118 so that fluid can travel through each channel 1118 from one end of the solar collection panel 1100 to an opposite end of the solar collection panel 1100.

The first sheet of material 1112 and the second sheet of material 1114 form the upper and lower portion of each channel 1118. The first sheet of material 1112 and the second sheet of material 1114 diverge from each other until a maximum point of divergence (i.e., a channel peak) is reached for each channel 1118. The maximum point of divergence can be proximate the center of each channel 1118. The maximum point of divergence is labeled as "h" in FIG. 11B.

In some embodiments, the maximum point of divergence h is within a range of from 0.02 inches to 0.50 inches. In some embodiments, the maximum point of divergence h for each channel 1118 in a solar collection panel 1100 is roughly uniform, such as within +/−0.01 inches of each other.

The maximum point of divergence h can be established during the manufacturing process based on the pressure applied into the enclosed area between the first sheet of material 1112 and the second sheet of material 1114. Generally speaking, the higher the pressure used to open the channels, the greater the maximum point of divergence h for each channel 1118. In some embodiments, the pressure applied into the enclosed area is in the range of from 1 psi to 300 psi, and more preferably, from 100 psi to 200 psi.

The shape of the internal volume of the channels formed is generally not limited. In some embodiments, the shape of the channels is impacted by the spacing of the line welds and/or the maximum point of divergence. In some embodiments, the channels have a generally cylindrical shape, including a cylindrical shape with an oval or ellipse cross-section.

More fluid can be present in a solar collection panel having a greater height h, which in turn means that more expansion and possible permanent deformation of the channels will occur if the fluid freezes. As a result, the maximum point of divergence and the pressure used to open the channels should be kept within the ranges provided above in order to provide solar collection panels that do not permanently deform when frozen and which can therefore withstand multiple freezing and thawing cycles.

The distance between line welds 1116 can be uniform or variable. In some embodiments, the line welds are spaced apart a generally uniform distance, such as within +/−0.1 inches. In some embodiments, the distance between line welds 1116 is from 0.1 inches to 3.0 inches, and more preferably, from 0.5 inches to 1.5 inches.

Spacing the line welds within this range helps to provide the solar collection panel with an appropriate amount of flexion. Within this range, the line welds are far enough apart so as to allow the channels to expand when, for example, water freezes inside the solar collection panel, while also not being spaced so far apart as to allow for excessive flexing. Excessive flexing can lead to permanent deformation and/or the formation of areas of weakness within the solar collection panel, both of which can lead to decreased efficiency and/or total failure.

The material of the first sheet 1112 and the second sheet 1114 can be similar or identical to the first and second sheets of material described above with respect to solar collection panels having pockets. In some embodiments, the first and second sheets of material are made from stainless steel and have a thickness in the range of from 0.0062 and 0.031 inches.

The relationship between the thickness of the material used and the spacing between line welds can be similar or identical to the relationship described above and set forth in Equation (1), with S being the distance between line welds instead of the distance between spot welds.

The pressure used to open the channels and establish the maximum pressure at which the solar collection panel 1100 can be operated without permanent change of pocket dimension can vary. For example, the Solar Rating and Certification Corporation requires all solar collection panels that are to connected directly to city water pressure undergo a pressure test of 160 psi. Thus, the pressure used to open the channels can be 160 psi or higher to ensure compliance with this standard.

The shape of first sheet of material 1112 and second sheet of material 1114 is generally not limited, which allows for custom solar collection panels to be manufactured that are better suited for blending into surrounding environment. The first sheet of material 1112 and the second sheet of material 1114 can be rectangular, but can also have a circular shape, a triangular shape, or a polygon having any number of sides. The shape of first sheet of material 1112 and second sheet of material 1114 may also have a regular polygon shape or an irregular polygon shape.

As noted above, the peripheral edges of the first sheet of material 1112 and the second sheet of material 1114 are secured to one another to form an enclosed area between the two sheets of material. The peripheral edges can be secured to one another by any suitable technique. In some embodiments, the edges are seam welded together. The seam welding can include the use of resistance welding. The line welding used to form line welds 1116 can also be seam welding, including resistance welding.

The inlet passages, outlet passages, and fittings illustrated in FIGS. 7 and 8 and described in greater detail above can also be used in the solar collection panel 1100. In some embodiments, the inlet passages, outlet passages, and fittings can be located at an end of one of the channels 1118. The inlet passages, outlet passages, and fittings can also be positioned in the distribution channels 1119.

Figure 12:
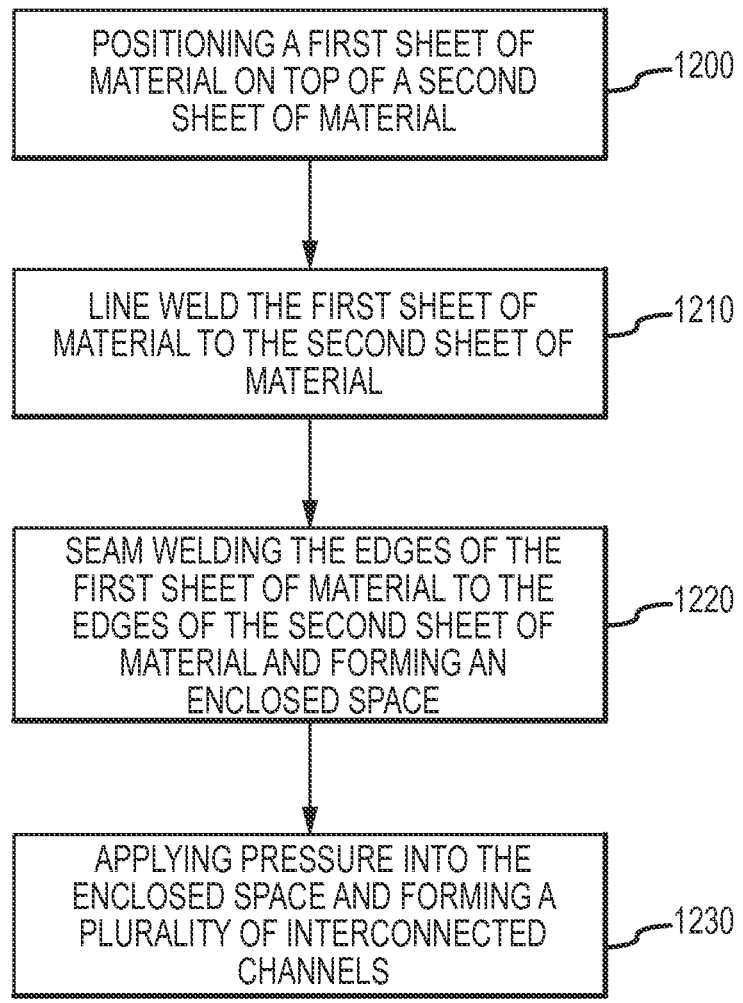
FIG. 12 is a flow chart outlining a method of manufacturing a solar collection panel according to embodiments described herein.

With reference to FIG. 12, a method for manufacturing the solar collection panel described above includes a step 1200 of positioning a first sheet of material on top of a second sheet of material having approximately the same size and shape as the first sheet of material, a step 1210 of line welding the first sheet of material to the second sheet of material in an the interior area of the first sheet of material, a step 1220 of seam welding the edges of the first sheet of material to the edges of the second sheet of material, and a step 1230 of applying pressure to the enclosed space formed between the first sheet of material and the second sheet of material. The application of pressure in step 1230 results in the formation of a series of interconnected channels between the two sheets of material through which fluid can flow.

In step 1200, a first sheet of material and a second sheet of material are provided and positioned on top of one another. The first and second sheet of material can be similar or identical to the first and second sheet of material described above in greater detail. In some embodiments, the two sheets of material are stainless steel and have a similar size and shape so that when the first sheet is positioned on top of the second sheet, the edges of the two sheets align with one another.

In step 1210, the first sheet of material is line welded to the second sheet of material along one or more lines in the interior area of the first sheet of material. In some embodiments, the first sheet of material is clamped together with the second sheet of material prior to performing the line welding. The line welding may be performed by hand or by automated machinery. In some embodiments, the seam welder shown in FIG. 10 can be use to form the line welds.

The number and arrangement of line welds is generally not limited. In some embodiments, the line welds are evenly spaced and are arranged in parallel to the sides of the first sheet of material. The line welds can run from proximate a first end of the first sheet of material to proximate a second end of the first sheet of material. Because the edges of the sheets of material will be secured via a subsequent seam welding step, it is preferable that the line welds do not extend all the way to the edges of the first sheet of material. In some embodiments, each line weld is a uniform distance away from adjacent line welds, and the range of uniform distance between line welds is from 0.1 inches to 3.0 inches.

In step 1220, the edges of the first sheet of material are seam welded to the edges of the second sheet of material. An aim of the seam welding is to form an enclosed area between the first sheet of material and the second sheet of material. The seam welding of the edges can be performed simultaneously or sequentially, and can be performed by hand or by an automated machine. As shown in FIG. 10, the seam welding may be performed by passing the edges between two rollers 362. The pressure exerted by these two rollers 362 may be controlled by pneumatic pressure and the rollers 362 may be moved along the length of the first and second sheets of material by an electric gear motor or motors. The speed of the wheels and voltage supplied to the wheels may be adjusted to create an optimum seam weld. The seam weld may be a resistance seam weld. The seam weld is preferably created along the entire length of the first and second sheets of material 361. In some embodiments, the seam weld is created at a distance 0.5 inches from the edge of the two sheets.

Once the two sheets are attached together and an air tight bond is created around the perimeter, a step 1230 of applying pressure in to the enclosed area between the two sheets can be performed. Applying pressure in to the enclosed area causes the first sheet to separate from the second sheet in the areas between line welds. This ultimately creates a series of interconnected channels through which the fluid can flow through.

Pressure can be applied into the enclosed are using any suitable material. In some embodiments, a gas or liquid is used to apply pressure into the enclosed area. The amount of pressure applied can generally range from 1 psi to 300 psi. The amount of pressure applied into the enclosed area will impact the height of the channels formed. In some embodiments, the amount of pressure applied into the enclosed area is such that the uniform height of the channels ranges from 0.01 inches to 0.50 inches.

The manner in which pressure is applied into the enclosed area is not limited. In some embodiments, the pressure is applied through a fitting and hole formed in the sheet of material prior to line welding and seam welding the two sheets of material. As described in greater detail above, a hole is cut in the first sheet of material and a fitting is secured to the first sheet material at the location of the hole. If two sets of holes and fittings are formed in the first sheet of material (e.g., an inlet fitting and an outlet fitting), one of the fittings can be plugged or capped prior to applying pressure into the enclosed area, or pressure can be applied through both fittings. The perimeter of the two sheets of material can be clamped in suitably sized frames in order to hold and support the two sheets of material during the application of pressure.

After application of pressure and formation of the series of interconnecting channels, tests can be performed on the solar collection panel to determine if the solar collection panel is appropriately sealed. The solar collection panel can be tested under water while under pressure to determine if any leaks exist. Additional welding can be carried out in leak locations to seal the solar collection panel.

At any point during or after the above described method, the color of the first sheet of material and second sheet of material may be changed. Changing the color of the first sheet of material and the second sheet of material may be achieved by any suitable means, such as painting or dyeing. Any type of paint may be used to change the color of the first and second sheets of material, including commercially available paints, such as Glidden™, Behr™ or Benjamin Moore™. The color may be changed to any color, including red, orange, yellow, green, blue, indigo and violet or any shade thereof. In one aspect, the color is a dark shade of one of the previously mentioned colors.

The surface of any of the solar collection panels described herein that will face the sun can be coated with a material that helps the solar collection panel operate with increased efficiency. Any suitable material known to those of ordinary skill in the art for use on solar collection panels can be used on the surface of the solar collection panel. In some embodiments, a siliconized paint is used, such as Thurmalox™, manufactured by Dampney Co., Inc. of Everett, Mass. The siliconized paint can be painted on to the appropriate surface and then cured at elevated temperatures to harden the paint and create a solid layer. Such coatings can help to collect more heat and increase the efficiency of the solar collection panel.

In some embodiments, any of the solar collection panels described herein is housed in a casing. The casing protects the solar collection panel from the environment and assists with the functioning of the solar collection panel. The casing can be made of any suitable material, such as steel, aluminum, or wood. The shape and size of the casing is not limited, although in some embodiments, the casing has a shape and size that is similar to the shape and size of the solar collection panel. For example, the shape and size of the casing can be such that the edges of the solar collection panel rest against the interior sides of the casing when the solar collection panel is placed in the casing.

Figure 13:
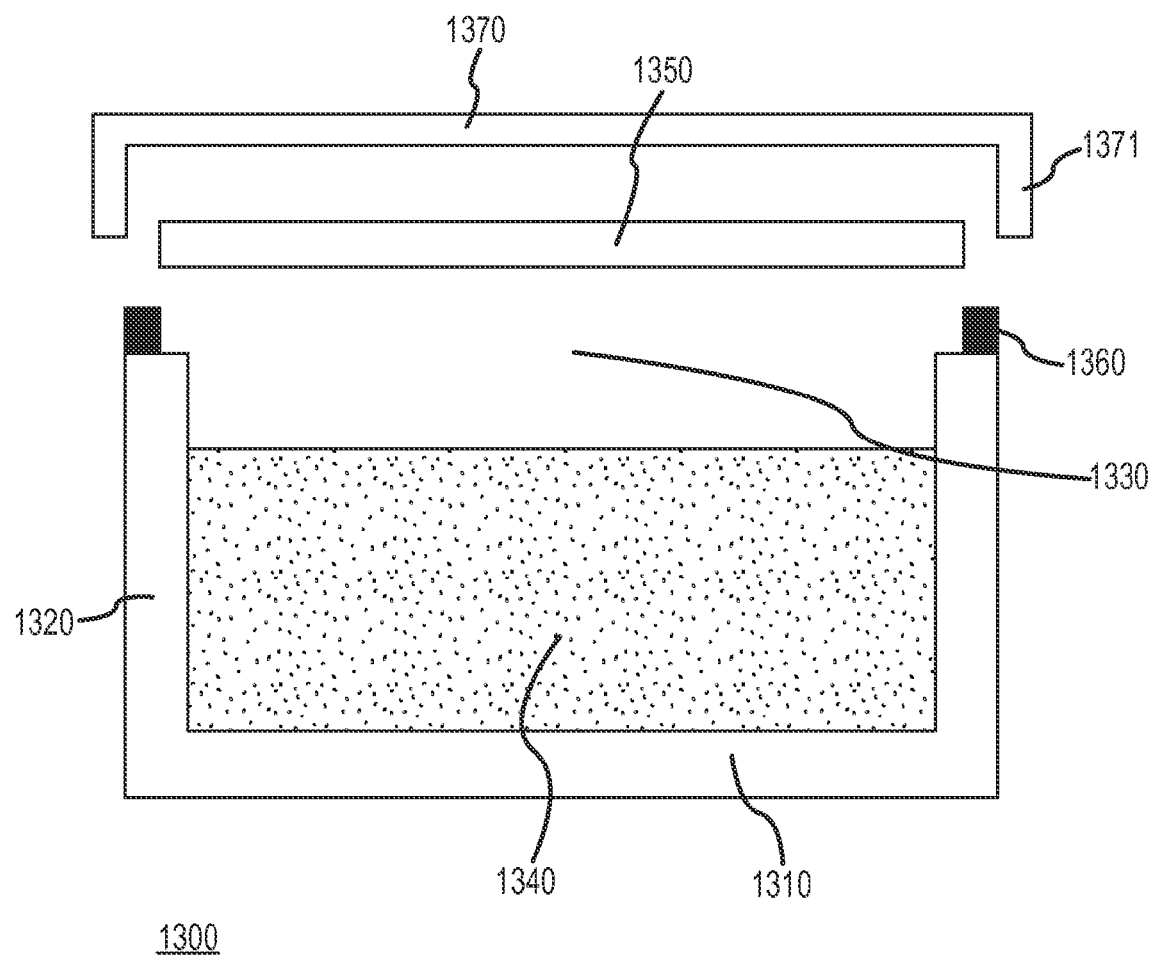
FIG. 13 illustrates a cross-sectional view of a casing suitable for use in housing some embodiments of the solar collection panel described herein.

With reference to FIG. 13, a casing 1300 for use with a solar collection panel can include a bottom portion 1310, side portions 1320, and an open top 1330 allowing for the solar collection panel to be placed in the casing 1300. The side portions 1320 can generally be oriented perpendicular to the bottom portion 1310 and can be aligned along each edge of the bottom portion 1310. The side portions 1320 can each have the same height.

In some embodiments, the solar collection panel is positioned in the casing 1300 such that the fittings of the solar collection panel protrude upward toward the open top 1330. Alternatively, the solar collection panel can be positioned in the casing 1300 so that the fittings protrude downwardly towards the bottom portion 1310 of the casing 1300. In either configuration, the casing 1300 can include inlet and outlet passages so that piping connected to the fittings can enter and exit the casing 1300 and allow for the movement of fluid in and out of the solar collection panel disposed in the casing 1300.

In some embodiments, the casing 1300 further includes insulation 1340 positioned within the casing 1300 and which the solar collection panel is positioned on top of In some embodiments, the insulation 1340 is positioned on the bottom portion 1310 and has a shape and size generally the same as the bottom portion. Any suitable type of insulation can be used, including fiberglass insulation. The insulation can be selected from insulation that is strong enough to support the weight of the solar collection panel. The amount of insulation included in the casing is generally not limited. In some embodiments, the thickness of the insulation is such that the solar collection panel can be disposed in the casing 1300 on top of the insulation 1340 while still providing a gap between the top of the solar collection panel and the cover that will be placed over the open top 1330 of the casing 1300.

Once the solar collection panel is disposed in the casing, a cover 1350 is placed over the open top 1330 of the casing 1300 to encapsulate the solar collection panel within the casing 1300. In some embodiments, the cover 1350 is a transparent material, such as tempered glass. In some embodiments, the cover 1350 has a shape and size that is approximately equal to the shape and size of the bottom portion 1310 so that the cover can rest on the side portions 1320 of the casing 1300. In some embodiments, the cover 1350 is secured to the casing 1300 in an effort to provide an air tight encapsulated space (although non-air tight casings can also be used, such as vented casings). Any manner of securing the cover 1350 to the casing 1300 can be used, including the use of double sided tape. The air tight seal can be supplemented by adding an additional barrier 1360 around the edges of the cover 1350 (in which case the cover 1350 should have a size that is slightly smaller than the external dimensions of the casing 1300 so that a shelf is provided upon which the additional barrier 1360 can be placed). In some embodiments, the barrier 1360 is a silicone material.

In some embodiments, an additional cover 1370 can be used to further ensure that the solar collection panel is sealed within the casing 1300. The additional cover 1370 can include a lip 1371 that extends down beyond the top edge of the side portions 1330 of the casing 1300. The additional cover 1370 can be secured to the casing 1300 to further effect an air tight seal, such as using glue or silicone material to secure the lip 1371 of the additional cover 1370 to the side portions 1330 of the casing 1300.

Several benefits are achieved by using a casing that is air tight. To begin with, the air tight casing serves as a vapor barrier that prevents moisture build up inside of the casing. Moisture inside a solar collection envelope is generally not permitted by regulatory boards overseeing solar water heating systems, and the embodiments described herein can mitigate or eliminate this issue. Because the casings described herein do allow moisture inside the casing, the efficiency and appearance of the solar collection panels is improved. The air tight casings also mitigate or eliminate issues relating to dust and debris getting inside the casing. Some prior art solar collection panels attempt to address the issue of moisture build up within a casing by providing a vent through which moisture can escape the casing. However, these same vents provide a route for dirt particles to get into the casing, where they can dirty the solar collection panel, the glass cover, and other components of the solar collection panel. The build up of debris inside the casing decreases efficiency and creates issues with respect to the appearance of the solar collection panel. The air tight casing described herein provides no path for debris to get inside the casing and therefore generally does not face any of these issues.

With or without the casing, the solar collection panels described herein can be positioned at an angle and facing a predetermined direction so as to maximize sun exposure. In some embodiments, the solar collection panel moves throughout the day (both direction and angle) to maximize sun exposure. Movement of the solar collection panel can be automated. The location of the solar collection panel can be on the ground or attached to a structure. The solar collection panel can also be positioned in any suitable location relative to fluid-containment vessel (i.e., above, to the side, below, etc.).

The fluid-containment vessel that makes up part of the solar heating system can be any suitable vessel for storing fluid, including existing fluid containment vessels to which the solar heating system described above is retro-fit. The fluid-containment vessel can be a closed fluid-containment vessel that does not provide exposure of its contents to the outside atmosphere. The shape and size of the fluid-containment vessel is not limited and can be dictated by the needs of the user. For example, larger residential buildings may require a larger fluid-containment vessel since larger quantities of water will be required. Similarly, the material of the fluid-containment vessel is not limited. In some embodiments, the material of the fluid-containment vessel is a material that is corrosion resistant to water so that the fluid-containment vessel does not corrode upon contact with water on the interior of the fluid-containment vessel.

The fluid containment vessel includes an inlet and an outlet so that, for example, water can travel into and out of the fluid containment vessel. The inlet of the fluid containment vessel can be in fluid communication with the outlet of the solar collection panel such that water that has been heated in the solar collection panel flows out of the solar collection panel and into the fluid containment vessel. In some embodiments, the inlet is located proximate the top of a vertically oriented fluid containment vessel. The outlet of the fluid containment vessel can be in fluid communication with the inlet of the solar collection panel such that water in the fluid containment vessel in need of heating or reheating flows out of the fluid containment vessel and into the solar collection panel. In some embodiments, the outlet is located near the bottom of a vertically oriented fluid containment vessel.

The mechanism used to provide fluid communication between the solar collection panel outlet and the fluid containment vessel inlet and between the fluid containment vessel outlet and the solar collection panel inlet is not limited. In some embodiments, the fluid communication is provided by a first set of piping and second set of piping. First set of piping and second set of piping can be made from any suitable material for transporting fluid throughout solar heating system. In some embodiments, first set of piping and second set of piping are made from a material that is resistant to corrosion by fluid that is flowing through solar heating system. First set of piping and second set of piping can have any suitable shape or dimensions, and the length of first set of piping and second set of piping can be determined by how far the solar collection panel and the fluid-containment vessel are spaced apart from each other. In some embodiments, the first and second set of piping is PEX piping or SilBrade tubing.

The solar water heating system described can include pumps where necessary to ensure the flow of fluid from the solar collection panel to the fluid containment vessel and from the fluid containment vessel to the solar collection panel. The solar water heating system described herein can also be set up as thermosyphon to minimize or eliminate the need for pumps. In such configurations, the solar collection panel is located entirely below the fluid containment vessel in order to take advantage of the thermosyphon.

The solar water heating system described herein can also be modified so that steam produced in the solar collection panel is used to generate power. In some conditions, the solar collection panel described herein is capable of heating water contained therein to the point of creating steam, which can then be removed from the solar collection panel and passed to a steam engine or the like. In some embodiments, steam can be generated in the solar collection panel during a stagnation period when a quantity of water remains in the solar collection panel and is exposed to solar heat for an extended period of time.

Figure 14:
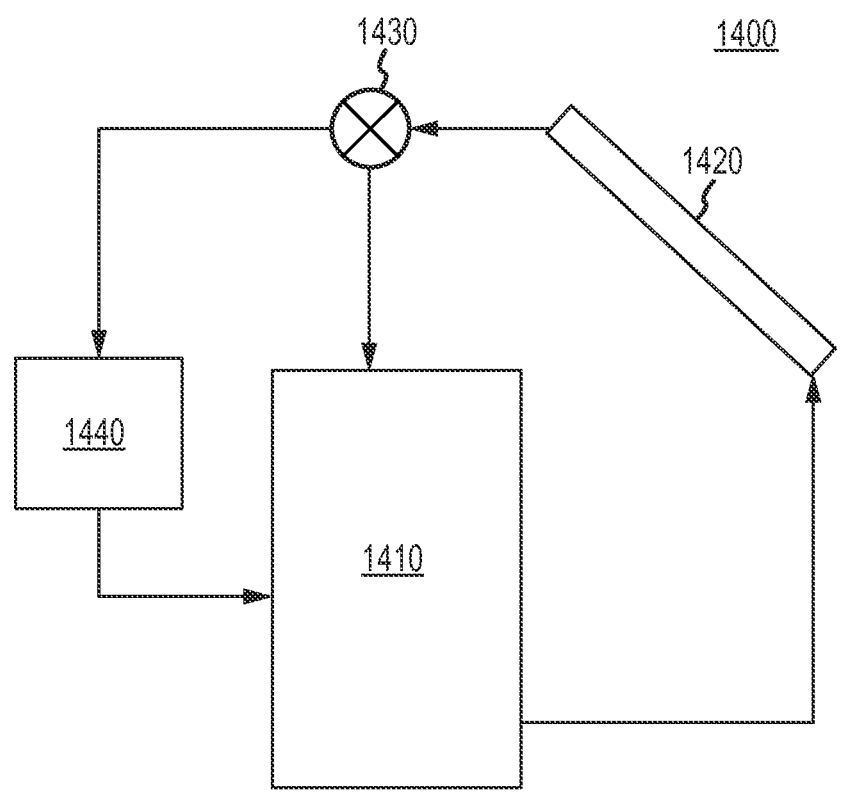
FIG. 14 illustrates a schematic view of embodiments of the solar hot water heating system described herein incorporating a steam engine.

With reference to FIG. 14, a modified solar water heating system 1400 includes a fluid containment vessel 1410, a solar collection panel 1420, a diverter valve 1430, and a steam engine 1440. In systems such as that shown in FIG. 14, the water typically continuously or semi-continuously cycles through the solar collection panel 1420 and the fluid containment vessel 1410 in order to heat the water or maintain the water at a desired temperature. For example, in domestic settings, the user may set a desired temperature of 160° F. or 180° F. for the water in the fluid containment vessel 1410. When this temperature has been reached, the cycling of water through the system 1400 is stopped so as to not heat the water beyond the desired temperature. When the cycling has stopped, a portion of the water remains in the solar collection panel 1420 and continues to be heated by solar energy.

In the system shown in FIG. 14, the water stagnating in the solar collection panel 1420 during non-cycling times can be heated by solar energy to the point of creating steam, at which time the diverter valve 1430 can be switched so that steam is allowed to leave the solar collection panel 1420 and be transported to the steam engine 1440. The diverter valve 1430 ensures that the steam travels to the steam engine 1440 and not back to the fluid containment vessel 1410. After the steam engine 1440 uses the steam to generate power, the waste heat from the steam engine 1440 can be sent to the fluid containment vessel 1410 to improve the efficiency of the steam engine 1440.

While reference is made above to a steam engine 1440, any equipment capable of using steam for generating power can be used in the system 1400 shown in FIG. 14. For example, the system 1400 can include a Sterling engine. The power produced by the steam engine or the like can be used for any of a variety of purposes, including the generation of electricity. In some embodiments, electricity generated by the system 1400 can be used to power an air conditioning unit used in the same building where the fluid containment vessel is located.

The steam generated by the solar collection panel 1420 can also be used in a variety of other ways, such as for heating via a heat exchanger or in other manufacturing methods.

In some embodiments, the above described system can include a water make-up line so that the water lost to steam production is replenished and the system is kept at a relatively constant volume of water. Sensors can be included to measure the amount of steam produced and diverted to the steam generator and report this information to the water make up line so that constant levels of water maintained in the system.

The above described system is useful and advantageous in that it better utilizes the solar energy available in some climates. In the unmodified system (i.e., the system without the diverter valve and the steam engine), the water stagnating in the solar collection panel continues to absorb solar energy without producing any desired result, and ultimately lowers the efficiency of the system. In the modified system, the additional solar energy is used to create steam, which can then be used to generate power. In this manner, a benefit is being achieved by the system even when it is in its dormant, stagnant state.

While certain embodiments and details have been included herein for purposes of illustrating aspects of the instant disclosure, it will be apparent to those skilled in the art that various changes in systems, apparatus, and methods disclosed herein may be made without departing from the scope of the instant disclosure, which is defined, in part, in the appended claims. The words "including" and "having," as used herein including the claims, shall have the same meaning as the word "comprising."

What is claimed is:

1. A solar collection panel comprising:

a first sheet; and a second sheet upon which the first sheet is positioned, wherein:

the peripheral edges of the first sheet are secured to the second sheet;

the first sheet is secured to the second sheet at a variety of connection points throughout the interior area of the first sheet, each connection point surrounded on all sides by areas of the first sheet that are not secured to the second sheet;

the first sheet and the second sheet are forced apart between the connection points to form a series of interconnecting fluid flow pockets whereby each connection point is surrounded by fluid flow pockets and isolated from all the other connection points;

an inlet fitting is positioned on the first sheet proximate the periphery of the first sheet and located at a first edge of the first sheet and in fluid communication with the series of interconnecting fluid flow pockets;

an outlet fitting is positioned on the first sheet proximate the periphery of the first sheet and located at a second edge of the first sheet opposite the first edge and in fluid communication with the series of interconnecting fluid flow pockets; wherein:

the uniform distance between connection points is from 0.1 inches to 3.0 inches and the uniform maximum height of the interconnecting pockets is from 0.01 inches to 0.50 inches;

the first sheet and the second sheet have a thickness in the range of from 0.013 to 0.025 inches and the solar collection panel does not permanently deform if water in the fluid flow pockets freezes: and the inlet fitting and the outlet fitting are secured to the first sheet using a countersink attachment; and a solar collection panel frame and a transparent sheet, wherein the first sheet, the second sheet, and the transparent sheet are mounted within the solar collection panel frame with the transparent sheet spaced from a solar collecting side of the first sheet.

2. A closed direct connected solar water heating system comprising:

a solar collection water-containment panel comprising:

a first sheet positioned on a second sheet, wherein:

the peripheral edges of the first sheet are secured to the second sheet, a plurality of connection points on the first sheet interior of the peripheral edges are secured to the second sheet, the connection points are a uniform distance from each other and the uniform distance ranges from 0.1 inches to 3.0 inches, and a series of interconnecting water channel pockets are formed throughout the interior area between the first sheet and the second sheet in forced-apart areas between the connection points:

an inlet fitting positioned on the first sheet proximate the periphery of the first sheet and located at a first edge of the first sheet and in fluid communication with the series of interconnecting water channel pockets; and an outlet fitting positioned on the first sheet proximate the periphery of the first sheet and located at a second edge of the first sheet opposite the first edge and in fluid communication with the series of interconnecting water channel pockets; wherein:

the inlet fitting and the outlet fitting are secured to the first sheet using a countersink attachment: and the first sheet and the second sheet have a thickness in the range of from 0.013 to 0.025 inches and the solar collection water-containment panel does not permanently deform if water in the fluid flow pockets freezes: and a fluid hot water-containment vessel comprising:

an inlet in fluid water transfer communication with the outlet fitting of the solar collection panel; and an outlet in fluid water transfer communication with the inlet fitting of the solar collection panel.

3. The closed direct connected solar water heating system as recited in claim 2, wherein the first sheet has approximately the same shape and size as the second sheet and the peripheral edges of the first sheet are secured to the peripheral edges of the second sheet.

4. The closed direct connected solar water heating system recited in claim 3, wherein the peripheral edges of the first sheet are seam weld attached to the peripheral edges of the second sheet.

5. The closed direct connected solar water heating system as recited in claim 2, wherein the series of interconnected water channel pockets are formed by securing the first sheet to the second sheet at a variety of connection points throughout the interior area of the first sheet and applying a pressure between the first sheet and the second sheet to form the interconnected water channel pockets between the connection points.

6. The closed direct connected solar water heating system as recited in claim 5, wherein the first sheet is secured to the second sheet at a variety of connection points via spot welding.

7. The closed direct connected solar water heating system as recited in claim 2, wherein the interconnected fluid channel pockets have a uniform maximum height and the uniform maximum height is from 0.01 inches to 0.50 inches.

8. The solar collection panel of claim 1 wherein:
(i) the inlet fitting is in water flow communication with the series of interconnecting water flow pockets;
(ii) the outlet fitting is in water flow communication with the series of interconnecting water flow pockets; and
(iii)
(iv) the series of interconnecting water flow pockets form an integral water flow channel and between the first sheet and the second sheet.

9. The solar collection panel as recited in claim 1, wherein the first sheet has approximately the same shape and size as the second sheet and the peripheral edges of the first sheet are secured to the peripheral edges of the second sheet.

10. The solar collection panel as recited in claim 1, wherein the peripheral edges of the first sheet are seam weld attached to the peripheral edges of the second sheet.

11. The solar collection panel as recited in claim 1, wherein the series of interconnected water channel pockets are formed by securing the first sheet to the second sheet at a variety of connection points throughout the interior area of the first sheet and applying a pressure between the first sheet and the second sheet to form the interconnected water channel pockets between the connection points.

12. The solar collection panel as recited in claim 1, wherein the first sheet is secured to the second sheet at a variety of connection points via spot welding.

13. The solar collection panel as recited in claim 1, wherein the interconnected fluid channel pockets have a uniform maximum height and the uniform maximum height is from 0.01 inches to 0.50 inches.

14. The closed direct connected solar water heating system of claim 1, wherein the series of interconnecting water flow pockets form an integral water flow channel between the first sheet and the second sheet.

* * * * *

UNITED STATES PATENT AND TRADEMARK OFFICE
CERTIFICATE OF CORRECTION

PATENT NO. : 8,955,509 B2  
APPLICATION NO. : 13/598173  
DATED : February 17, 2015  
INVENTOR(S) : Auguste Lemaire et al.

Page 1 of 1

It is certified that error appears in the above-identified patent and that said Letters Patent is hereby corrected as shown below:

Column 21, line 11, claim 1, delete ":" and insert --;--

Column 21, line 33, claim 2, delete ":" and insert --;--

Column 21, line 44, claim 2, delete ":" and insert --;--

Column 21, line 48, claim 2, delete ":" and insert --;--

Column 22, line 27, claim 8, delete "(iii)"

Column 22, line 29, claim 8, delete "and" between the words channel and between

Signed and Sealed this  
Twenty-fourth Day of November, 2015

Michelle K. Lee  
*Director of the United States Patent and Trademark Office*